United States Patent
Martin et al.

(10) Patent No.: US 7,861,611 B2
(45) Date of Patent: Jan. 4, 2011

(54) STOP DEVICE

(75) Inventors: Steven James Martin, Telford (GB); Scott Gary Haldron, Essington (GB)

(73) Assignee: Goodrich Actuation Systems Limited (GB)

( * ) Notice: Subject to any disclaimer, the term of this patent is extended or adjusted under 35 U.S.C. 154(b) by 276 days.

(21) Appl. No.: 12/057,484

(22) Filed: Mar. 28, 2008

(65) Prior Publication Data

US 2008/0236309 A1    Oct. 2, 2008

(30) Foreign Application Priority Data

Mar. 30, 2007    (GB)    ................... 0706248.2

(51) Int. Cl.
F16H 25/20    (2006.01)
(52) U.S. Cl. ..................... 74/89.37; 74/89.39
(58) Field of Classification Search ............... 74/89.37, 74/89.39, 89.23, 89.34, 424.72
See application file for complete search history.

(56) References Cited

U.S. PATENT DOCUMENTS

| | | | |
|---|---|---|---|
| 2,417,434 A | | 3/1947 | Mead et al. |
| 2,620,911 A | * | 12/1952 | Krell ........................... 192/141 |
| 2,719,129 A | * | 9/1955 | Richardson ................... 424/45 |
| 2,936,645 A | * | 5/1960 | Morris et al. ................. 74/441 |
| 3,546,930 A | | 12/1970 | Flarsheim |
| 4,064,981 A | * | 12/1977 | House et al. ................ 192/141 |
| 4,751,988 A | | 6/1988 | Metcalf |
| 4,867,295 A | * | 9/1989 | Metcalf et al. ............. 192/141 |
| 5,088,339 A | | 2/1992 | Lochmoeller |
| 5,467,661 A | * | 11/1995 | Lange ......................... 74/441 |
| 2004/0021116 A1 | | 2/2004 | Neu et al. |

FOREIGN PATENT DOCUMENTS

DE    3523162    1/1986

OTHER PUBLICATIONS

European Search Report dated Feb. 15, 2010.

* cited by examiner

*Primary Examiner*—Richard W Ridley
*Assistant Examiner*—Terence Boes
(74) *Attorney, Agent, or Firm*—Andrus, Sceales, Starke & Sawall, LLP

(57) ABSTRACT

A stop device comprises a rotatable shaft, a travelling nut mounted upon the shaft in such a manner that rotation of the shaft causes the nut to translate along the shaft, and a stop member mounted upon the shaft and operable to limit the length of the shaft along which the travelling nut can translate, wherein the stop member is adjustably mounted upon the shaft.

15 Claims, 2 Drawing Sheets

STOP DEVICE

This invention relates to a stop device operable to restrict the movement of another component to limit its travel. In particular, the invention relates to a stop device suitable for use with the actuator associated with a door or hatch of an aircraft to limit the movement thereof.

A door or hatch of an aircraft is typically driven between its closed and opened positions by an actuator, for example in the form of a geared rotary actuator or geared hinge. In order to permit a relatively small, low powered motor to be used in this application it is usual for the gearing of the actuator to provide a large step-down gear ratio. One form of actuator used in such applications includes an input shaft carrying an input sun gear, a plurality of planetary gears having sets of teeth meshed both with the sun gear and with an earthed ring gear such that rotation of the sun gear causes both rotation of the planetary gears and precession of the planetary gears about the axis of the sun gear. The planetary gears further mesh with an output ring gear, and the numbers of teeth provided on the ring gears, the sun gear and the planetary gears are chosen such that rotation of the input shaft and sun gear drives the output ring gear for rotation or angular movement relative to the earthed ring gear. In one example, the gearing is such that approximately 650 rotations of the input shaft are required to cause the output ring gear and the door mounted thereon or associated therewith to move through 90°. In some circumstances, door movement may also be gravity assisted which can significantly increase the speed of movement of the door.

Due to the high gearing involved, over rotation of the input shaft, and hence over rotation of the actuator, in the opening direction, has the potential to overstress the door and/or actuator mounting points. Obviously this is undesirable. Over rotation in the door closing direction, although still desirably avoided, is less of a problem as stops can be incorporated in the frame against which the door can be driven, the stops being designed in such a manner as to be able to withstand the applied loadings.

Sensors can be provided to monitor the door position, either directly or by monitoring the operation of the actuator or motor, the output of which can be used to switch off the drive when the door reaches its desired position. However, there is a requirement to provide a stop device to physically prevent over rotation.

A number of stop devices are known which can be used to limit the rotation of an actuator. For example U.S. Pat. Nos. 4,064,981 and 2,620,911 describe arrangements in which a screw-threaded shaft is rotated, in use, by being geared to the input or output shaft of an actuator. A nut is carried by the shaft, the nut being fixed against rotation so that operation of the actuator, and hence rotation of the shaft, causes the nut to translate along the shaft. Friction brake arrangements are provided against which the nut can engage once a predetermined position has been reached, such engagement applying a braking load to the shaft and hence to the actuator. Such devices have the disadvantage that accurate adjustment of the position of the nut, and hence the actuator, at which the braking load is applied is difficult or not possible. Consequently there is still a risk of over rotation occurring.

U.S. Pat. No. 4,867,295 describes an arrangement in which limited adjustment may be possible, but the design is such that the adjustment must be undertaken prior to assembly of the stop device, and so accurate adjustment is still difficult or not possible.

According to the present invention there is provided a stop device comprising a rotatable shaft, a travelling nut mounted upon the shaft in such a manner that rotation of the shaft causes the nut to translate along the shaft, and a stop member mounted upon the shaft and operable to limit the length of the shaft along which the travelling nut can translate, wherein the stop member is adjustably mounted upon the shaft.

By appropriate positioning of the stop member, the length of the shaft along which the nut can translate, and hence the limit of rotary motion of the shaft and an actuator or the like linked thereto can be accurately controlled.

The stop member is preferably threaded to the shaft so that relative angular movement between the stop member and the shaft results in adjustment of the axial position of the stop member.

Preferably, a retainer is provided to hold the stop member against movement relative to the shaft.

Preferably, a splined coupling is provided to permit the retainer to be secured to the shaft in a plurality of different angular positions. The splined coupling may include a first splined region which co-operates with the shaft and a second splined region which co-operates with the retainer. The number of spline teeth in the first and second splined regions preferably differ by only a small number, for example by a single spline tooth.

The travelling nut and the stop member are preferably provided with features which engage one another to prevent further movement of the travelling nut when the limit of the translational movement thereof has been reached. The inter-engaging features are arranged such that the surface areas thereof over which contact is made are independent of the position occupied by the stop member.

The invention will further be described, by way of example, with reference to the accompanying drawings, in which.

Figure 1:
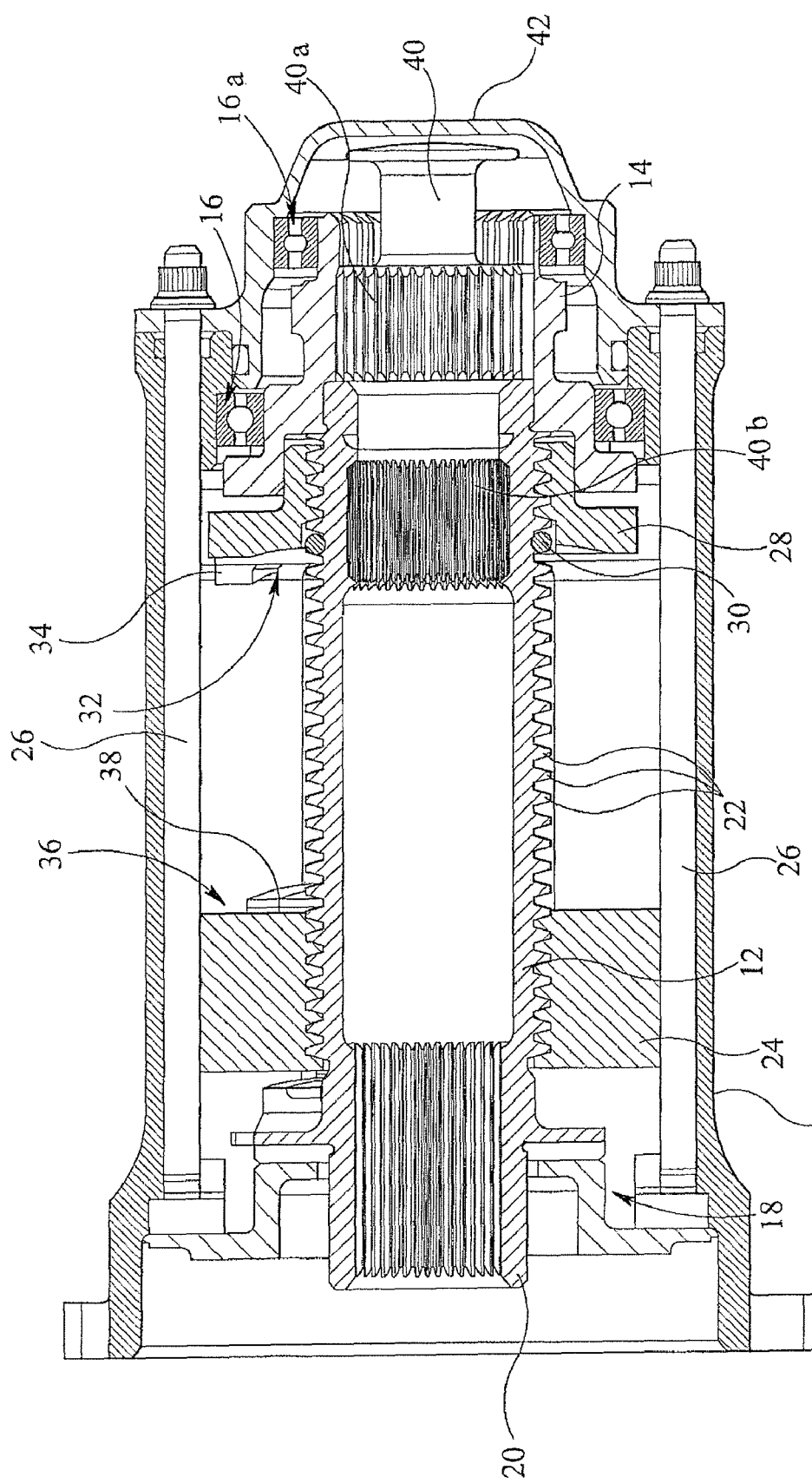
FIG. 1 is a sectional view of a stop device in accordance with one embodiment of the invention.
Figure 2:
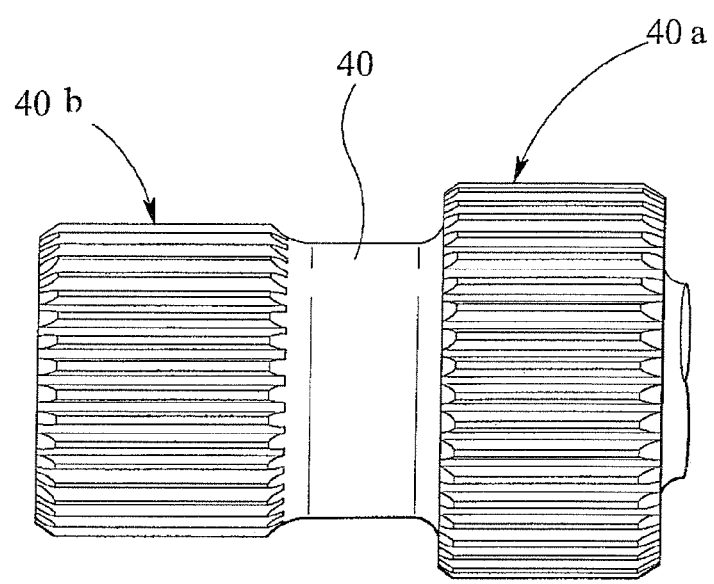
FIG. 2 is a view illustrating part of the splined coupling of the stop device shown in FIG. 1.
Figure 3:
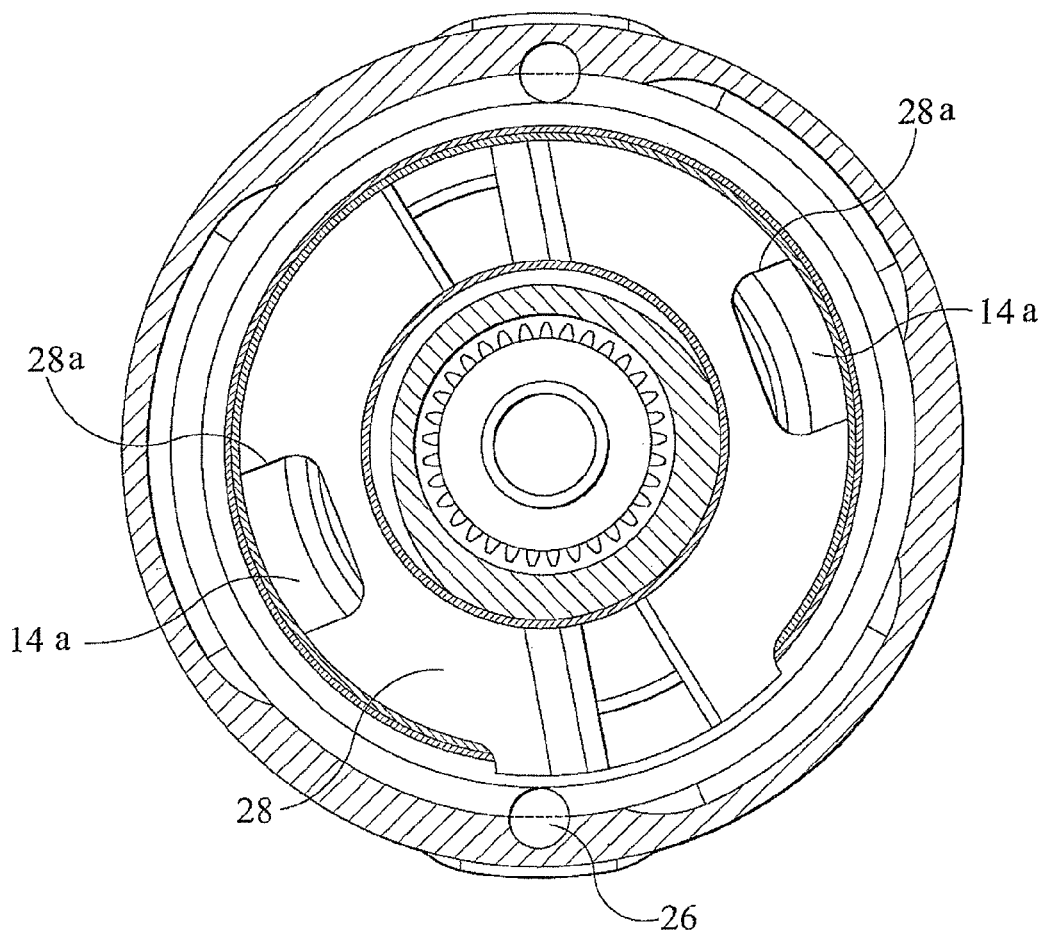
FIG. 3 is another, sectional, view illustrating part of the stop device.

The stop device illustrated in the accompanying drawings comprises a housing 10 within which is located a rotatable shaft 12. The shaft 12 is supported, at one end, by a retainer 14 which is guided for rotary movement within the housing 10 by bearings 16. If desired, additional bearings 16a may be provided between the retainer 14 and, for example, a cap 42 (see below). A thrust bearing arrangement 18 is provided to ensure that, although rotary movement of the shaft 12 is permitted, substantially no translatory movement of the shaft 12 in its axial direction is permitted. The shaft 12 is provided with splines 20 whereby the shaft 12 can be connected to a drive shaft (not shown) to allow the shaft 12 to be rotated at a speed related to the operating speed of an associated actuator.

The shaft 12 is provided, on its external surface, with screw-thread formations 22 with which a travelling nut 24 is engaged. The nut 24 is held against rotation within the housing 10 by rails 26. It will be appreciated that as the travelling nut 24 is held against rotation, upon rotation of the shaft 12 occurring, the travelling nut 24 will translate within the housing 10, the position occupied by the travelling nut 24 at any given time being dependent upon the number of revolutions of the shaft 12 away from a datum position.

A stop member 28 is secured to the screw-thread formations 22 of the shaft 12, and it will be appreciated that the axial position of the stop member 28 will be dependent upon its angular position relative to the shaft 12 by virtue of the threaded connection of the stop member 28 upon the shaft 12. An O-ring 30 is located in a groove formed on the shaft 12 to limit adjustment of the stop member 28 relative to the shaft 12. The stop member 28 includes a surface 32 provided with abutment formations 34, the surface 32 facing a corresponding surface 36 of the travelling nut 24, the surface 36 also being provided with abutment formations 38. It will be appreciated that, in use, rotation of the shaft 12 results in the travelling nut translating along the length of the shaft 12 until such time as the abutment formations 34, 38 abut one another. Once this position is reached, further translating movement of the travelling nut 24 is not possible, and the nature of the threaded mounting of the travelling nut 24 upon the shaft 12 results in further rotation of the shaft 12 being prevented. As rotation of the shaft 12 is no longer permitted, it will be appreciated that further movement of the actuator with which the stop device is used is also prevented. The axial position of the stop member 28 on the shaft 12 determines when this engagement or abutment occurs, and so determines the degree of permitted movement of the associated actuator.

The retainer 14, in addition to supporting one end of the shaft 12, abuts the stop member 28, the nature of the abutment being such that angular movement of the stop member 28 relative to the retainer 14 is not permitted. This is achieved by providing the stop member 28 with a plurality of recesses 28a which are engaged by corresponding fingers 14a of the retainer 14. Although relative angular movement between the stop member 28 and retainer 14 is not permitted, limited relative axial movement can be accommodated by the fingers 14a sliding in the recesses 28a during adjustment of the position of the stop member 28 by rotation of the retainer 14 relative to the shaft 12.

The retainer 14 is provided, internally, with a series of spline grooves which, in use, engage or receive corresponding spline teeth 40a of a removable splined coupling member 40. The splined coupling member 40 is further provided with a second series of spline teeth 40b which are received in or engaged corresponding spline grooves formed in the interior of the shaft 12, in use. Consequently, it will be appreciated that the splined coupling member 40 serves to lock the retainer 14, and hence the stop member 28, against angular movement relative to the shaft 12.

The housing 10 is provided with a removable cap 42 whereby access to the retainer 14 and splined coupling member 40 can be achieved when the cap 42 is removed.

In use, the splined region 20 of the shaft 12 is coupled to the drive shaft of a geared actuator through a step-down gear box (not shown). The gear box has a gear ratio of 50:1 so that when used with an actuator of the type described, generally, hereinbefore in which the drive shaft rotates through approximately 650 revolutions in order to move the door from its fully closed position to its fully open position, the shaft 12 will undertake approximately 13 revolutions. Once the shaft 12 has completed the 13 revolutions, it will be appreciated that the travelling nut 24 will have moved along the shaft 12 bringing the abutments 34, 38 into contact with one another whereby further movement of the travelling nut 24, and hence rotation of the shaft 12 and actuator drive shaft is not permitted. Over rotation of the actuator, and the associated risk of damage to the door or actuator mountings is thereby avoided.

During initial setting up of the stop device, and/or during maintenance and servicing operations, the stop device can be adjusted to ensure that opening movement is terminated in the desired position. This is achieved by removing the cap 42 and the splined coupling member 40. It will be appreciated that with the splined coupling member 40 removed, the retainer 14 and hence the stop member 28 can be rotated relative to the shaft 12, and this rotation results in adjustment of the axial position of the stop member 28 on the shaft 12. The actuator can be moved to its desired stop position, and it will be appreciated that this movement will result in the travelling nut 24 being moved to its corresponding stop position. Once the nut 24 has been moved to its stop position, the retainer 14 and hence stop member 28 are rotated relative to the shaft 12 to bring the abutment surfaces 34, 38 into engagement with one another. Rotation of the retainer 14 during this operation is assisted by the formation of flats or the like thereon to allow an appropriate tool to be used to rotate the retainer 14.

Once the stop member 28 and retainer 14 have reached the desired position the splined coupling member 40 is re-introduced to lock the retainer 14 to the shaft 12 and thereby resist angular, and hence axial movement of the stop member 28 relative to the shaft 12. Once the splined coupling member 40 has been re-introduced in this manner, the cap 42 can be re-fitted to the stop device.

The first and second splined regions 40a, 40b of the splined coupling member 40 conveniently have slightly different numbers of spline teeth formed thereon. In the illustrated embodiment, the second region 40b has 40 spline teeth and the first region 40a has 41 spline teeth. It will be appreciated that this small difference in the number of spline teeth means that, for a given angular position of the retainer 14 relative to the shaft 12, the splined coupling member 40 will only fit properly into the shaft 12 and retainer 14 in one angular orientation, and so several attempts to introduce the splined coupling member 40 into position may be required with the splined coupling member 40 in different angular orientations. This arrangement is advantageous in that a very fine level of adjustment of the angular position of the retainer 14 and stop member 28 relative to the shaft 12 can be achieved. Consequently, the maximum travel of the stop device and associated actuator can be set to a high degree of accuracy.

The abutment formations 34, 38 are designed so that the surface area over which contact between the formations 34, 38 occurs when the travelling nut 24 reaches the limit of travel is uniform and independent of the angular orientations of the stop member 28 and nut 24.

In the arrangement described hereinbefore, the stop device serves only to control or limit movement of the actuator in one rotary direction, for example in the opening direction of an associated hatch or door. It will be appreciated, however, that the invention may also be applicable to stop devices having the ability to limit actuator movement in both rotary directions.

A range of modifications and alterations may be made to the arrangement described hereinbefore without departing from the scope of the invention.

The invention claimed is:

1. A stop device comprising a rotatable shaft rotatable relative to a housing, a travelling nut mounted upon the shaft in such a manner that rotation of the shaft causes the nut to translate along the shaft, a stop member mounted upon the shaft and operable to limit the length of the shaft along which the travelling nut can translate, the stop member being threaded to the shaft so that relative angular movement between the stop member and the shaft results in adjustment of the axial position of the stop member, a retainer providing support for the shaft and to hold the stop member against angular movement relative to the shaft, wherein the retainer is mounted for rotation within the housing by bearings and is fixed against axial movement relative to the shaft and provides support for the shaft, and a splined connection between the shaft and the retainer to permit the retainer to be secured to the shaft in a plurality of different angular positions.

2. A device according to claim 1, wherein the splined coupling includes a first splined region which co-operates with the shaft and a second splined region which co-operates with the retainer.

3. A device according to claim 2, wherein the first and second splined regions have different numbers of spline teeth formed thereon.

4. A device according to claim 3, wherein the number of spline teeth differs by one.

5. A device according to claim 1, wherein the splined coupling is removable.

6. A device according to claim 1, wherein the travelling nut and the stop member are provided with features which engage one another to prevent further movement of the travelling nut when the limit of the translational movement thereof has been reached.

7. A device according to claim 6, wherein the inter-engaging features are arranged such that the surface areas thereof over which contact is made are independent of the position occupied by the stop member.

8. A stop device comprising a rotatable shaft rotatable relative to a housing, a travelling nut mounted upon the shaft in such a manner that rotation of the shaft causes the nut to translate along the shaft, a stop member mounted upon the shaft and operable to limit the length of the shaft along which the travelling nut can translate, the stop member being threaded to the shaft so that relative angular movement between the stop member and the shaft results in adjustment of the axial position of the stop member, and a retainer is disposed inside of bearings to hold the stop member against movement relative to the shaft, wherein the retainer is guided for rotary movement within the housing by said bearings and provides support for the shaft.

9. A device according to claim 8, further comprising a splined coupling to permit the retainer to be secured to the shaft in a plurality of different angular positions.

10. A device according to claim 9, wherein the splined coupling is removable.

11. A device according to claim 9, wherein the splined coupling includes a first splined region with co-operates with the shaft and a second splined region which co-operates with the retainer.

12. A device according to claim 11, wherein the first and second splined regions have different numbers of spline teeth formed thereon.

13. A device according to claim 12, wherein the numbers of spline teeth differs by one.

14. A device according to claim 8, wherein the travelling nut and the stop member are provided with features which engage one another to prevent further movement of the travelling nut when the limit of the translation movement thereof has been reached.

15. A device according to claim 14, wherein the inter-engaging features are arranged such that the surface areas thereof, over which contact is made, are independent of the position occupied by the stop member.

* * * * *